US012645011B2

(12) United States Patent
Nelson et al.

(10) Patent No.: US 12,645,011 B2
(45) Date of Patent: Jun. 2, 2026

(54) OPTICAL METASURFACES WITH HIGH ASPECT RATIO UNIT CELLS FOR LARGE DEFLECTION ANGLES

(71) Applicant: CORNING INCORPORATED, Corning, NY (US)

(72) Inventors: Cameron Robert Nelson, Elmira, NY (US); Alexander Yutong Zhu, Santa Clara, CA (US)

(73) Assignee: CORNING INCORPORATED, Corning, NY (US)

( * ) Notice: Subject to any disclaimer, the term of this patent is extended or adjusted under 35 U.S.C. 154(b) by 344 days.

(21) Appl. No.: 18/279,928

(22) PCT Filed: Mar. 3, 2022

(86) PCT No.: PCT/US2022/018621
§ 371 (c)(1),
(2) Date: Sep. 1, 2023

(87) PCT Pub. No.: WO2022/187430
PCT Pub. Date: Sep. 9, 2022

(65) Prior Publication Data
US 2024/0151876 A1 May 9, 2024

Related U.S. Application Data

(60) Provisional application No. 63/156,973, filed on Mar. 5, 2021.

(51) Int. Cl.
*G02B 1/00* (2006.01)
(52) U.S. Cl.
CPC ........ *G02B 1/002* (2013.01); *G02B 2207/101* (2013.01)

(58) Field of Classification Search
CPC .......................... G02B 1/002; G02B 2207/101
(Continued)

(56) References Cited

U.S. PATENT DOCUMENTS 10,930,710 B2 * 2/2021 Drzaic ................. H10K 59/879
2017/0212285 A1 7/2017 Arbabi et al.
(Continued)

FOREIGN PATENT DOCUMENTS

TW 202035151 A 10/2020
WO 2021/016714 A1 2/2021

OTHER PUBLICATIONS

Taiwanese Patent Application No. 111107884, Office Action dated Jul. 16, 2025, 5 pages (English Translation only), Taiwanese Patent Office.

(Continued)

*Primary Examiner* — William R Alexander
(74) *Attorney, Agent, or Firm* — Svetlana Z. Short

(57) ABSTRACT

An optical metasurface includes a substrate and a plurality of nanostructures extending from a surface of the substrate and constructed of a material having an index of refraction. The plurality of nanostructures are arranged in a plurality of unit cells comprising a dimension that is less than or equal to twice an effective wavelength of light incident on the optical metasurface, divided by the sinusoid of a deflection angle that the optical metasurface is designed to deflect the light. The plurality of nanostructures are asymmetrically arranged along a deflection direction. A unit cell aspect ratio of the plurality of nanostructures is greater than or equal to 3, and a product of the unit cell aspect ratio and the index of refraction of the material is greater than or equal to 8.

33 Claims, 10 Drawing Sheets

(58) Field of Classification Search
  USPC .......................................................... 359/844
  See application file for complete search history.

(56)                    References Cited

U.S. PATENT DOCUMENTS

| | | | | |
|---|---|---|---|---|
| 2018/0323242 | A1* | 11/2018 | Drzaic | ................. H10K 59/879 |
| 2019/0154877 | A1* | 5/2019 | Capasso | ................... G02B 5/18 |
| 2019/0162592 | A1* | 5/2019 | Khorasaninejad | ........ G01J 3/00 |
| 2019/0339543 | A1 | 11/2019 | Zhu et al. | |
| 2020/0025975 | A1 | 1/2020 | Kamali et al. | |
| 2021/0063606 | A1 | 3/2021 | Glik et al. | |
| 2021/0181515 | A1* | 6/2021 | Ellenbogen | ............. G06F 3/013 |
| 2021/0347135 | A1 | 11/2021 | Van et al. | |
| 2022/0052093 | A1* | 2/2022 | Devlin | ................... G02B 1/002 |

OTHER PUBLICATIONS

International Search Report and Written Opinion of the International Searching Authority; PCT/US2022/018621; mailed on Jun. 14, 2022, 15 pages; European Patent Office.

* cited by examiner

OPTICAL METASURFACES WITH HIGH ASPECT RATIO UNIT CELLS FOR LARGE DEFLECTION ANGLES

CROSS REFERENCE TO RELATED APPLICATIONS

This application claims the benefit of priority under 35 U.S.C. § 371 of International Application No. PCT/US2022/018621, filed on Mar. 3, 2022, which claims the benefit of priority under 35 U.S.C. § 119 of U.S. Provisional Application No. 63/156,973, filed on Mar. 5, 2021, the content of which is relied upon and incorporated herein by reference in its entirety.

FIELD

The present disclosure pertains to optical metasurfaces with nanostructures for deflecting light at large deflection angles.

TECHNICAL BACKGROUND

Optical metasurfaces are a source of significant interest because they have the ability to manipulate various aspects of incoming radiation (e.g., amplitude, phase, and polarization) to achieve a wide range of useful functions (e.g., beam steering, focusing, polarization multiplexing/de-multiplexing, spectral filtering, and others). Metasurfaces are attractive for their ability to perform functions typically served through traditional optical elements, like lenses, polarizers, and beam splitters, while being much lighter in weight, more compact, and less expensive. However, the efficiency of existing metasurface-based optical devices typically falls below 50% with increasing deflection angle. Without wishing to be bound by theory, such low efficiency at high deflection angles may be attributed to the reduced phase sampling that occurs at large angles, as well as near-field coupling and interactions between neighboring nanostructures. As a result, current optical metasurfaces are limited in their ability to replace conventional optical elements in certain applications (e.g., high numerical aperture lenses, various forms of grating couplers).

SUMMARY

A first aspect of the present disclosure includes an optical metasurface comprising: a substrate; and a plurality of nanostructures extending from a surface of the substrate and constructed of a material having an index of refraction. The plurality of nanostructures are arranged in a plurality of unit cells. Each of the plurality of unit cells comprises: a dimension that is less than or equal to twice an effective wavelength of light incident on the optical metasurface, divided by the sinusoid of a deflection angle that the optical metasurface is designed to deflect the light; a nanostructure arrangement of one or more of the plurality of nanostructures that is asymmetrical along a deflection direction of the optical metasurface; and a unit cell aspect ratio defined by a height of the one or more of the plurality of nanostructures divided by a minimum cross-sectional dimension of the one or more of the plurality of nanostructures, wherein the unit cell aspect ratio is greater than or equal to 3, and a product of the unit cell aspect ratio and the index of refraction of the material is greater than or equal to 8.

A second aspect of the present disclosure includes an optical metasurface according to the first aspect, wherein the plurality of unit cells are arranged in a two-dimensional pattern covering an area of the surface of the substrate.

A third aspect of the present disclosure includes an optical metasurface according to any of the first through second aspects, wherein the unit cell aspect ratio is greater than or equal to 3.

A fourth aspect of the present disclosure includes an optical metasurface according to any of the first through third aspects, wherein the unit cell aspect ratio is greater than or equal to 10.

A fifth aspect of the present disclosure includes an optical metasurface according to any of the first through fourth aspects, wherein the index of refraction of the material is greater than or equal to 2.

A sixth aspect of the present disclosure includes an optical metasurface according to any of the first through fifth aspect, wherein each of the plurality of unit cells comprises a single nanostructure of the plurality of nanostructures, the single nanostructure comprising a peripheral shape that is asymmetrical along the deflection direction.

A seventh aspect of the present disclosure includes an optical metasurface according to any of the first through sixth aspects, wherein the single nanostructure of each of the plurality of unit cells comprises a first portion and second portion extending from the first portion, the first and second portions comprising overlapping portions of different pillar structures.

An eighth aspect of the present disclosure includes an optical metasurface according to any of the first through seventh aspects, wherein each of the plurality of unit cells comprises two or more nanostructures.

A ninth aspect of the present disclosure includes an optical metasurface according to any of the first through eighth aspects, wherein the two or more nanostructures of each of the plurality of unit cells comprise the same cross-sectional shape, but have different cross-sectional areas.

A tenth aspect of the present disclosure includes an optical metasurface according to any of the first through ninth aspects, wherein one of the two or more nanostructures of each of the plurality of unit cells comprises a truncated version of another one of the two or more nanostructures of the unit cell.

An eleventh aspect of the present disclosure includes an optical metasurface according to any of the first through tenth aspects, wherein the optical metasurface deflects an optical signal at a wavelength along the deflection direction by a deflection angle of greater than or equal to 50° relative to an initial propagation direction of the optical signal prior to encountering the optical metasurface.

A twelfth aspect of the present disclosure includes an optical metasurface according to any of the first through eleventh aspects, wherein the deflection of the optical signal by the optical metasurface by the deflection angle occurs with an absolute efficiency of greater than or equal to 70%.

A thirteenth aspect of the present disclosure includes an optical metasurface according to any of the first through twelfth aspects, wherein the deflection of the optical signal by the optical metasurface by the deflection angle occurs with the absolute efficiency within an entirety of a 40 nm wavelength range.

A fourteenth aspect of the present disclosure includes an optical metasurface according to any of the first through thirteenth aspects, wherein the 40 nm wavelength range is within the visible spectrum.

A fifteenth aspect of the present disclosure includes an optical metasurface according to any of the first through fourteenth aspects, wherein the optical metasurface is incorporated into an optical element comprising at least one of a lens, grating, mirror, and axicon.

A sixteenth aspect of the present disclosure includes an optical element comprising: a surface; and a plurality of unit cells arranged in a two-dimensional periodic structure on the surface, the two-dimensional periodic structure having periods in a first direction and a second direction extending perpendicular to the first direction that are less than or equal to 3 μm. Each of the unit cells comprises one or more nanostructures comprising an index of refraction and an asymmetrical structure; and a unit cell aspect ratio defined by a length of the one or more of the plurality of nanostructures divided by a minimum cross-sectional dimension of the one or more of the plurality of nanostructures, wherein the unit cell aspect ratio is greater than or equal to 3, and a product of the unit cell aspect ratio and the index of refraction is greater than or equal to 8.

A seventeenth aspect of the present disclosure includes an optical element according to the sixteenth aspect, wherein: each of the plurality of unit cells deflects an optical signal by a deflection angle along a deflection direction determined based on the structure and arrangement of the one or more nanostructures of the unit cell; and the asymmetrical structure of the one or more nanostructures associated with one of the plurality of unit cells is asymmetrical along the deflection direction of that unit cell.

An eighteenth aspect of the present disclosure includes an optical element according to any of the sixteenth through the seventeenth aspects, wherein the plurality of unit cells have spatially varying geometric properties along the surface to provide a distribution of deflection angles for the optical signal.

A nineteenth aspect of the present disclosure includes an optical element according to any of the sixteenth through the eighteenth aspects, wherein a portion of the plurality of unit cells deflects the optical signal by a deflection angle that is greater than or equal to 50°.

A twentieth aspect of the present disclosure includes an optical element according to any of the sixteenth through the nineteenth aspects, wherein the optical element is a diffractive lens focusing the optical signal.

A twenty first aspect of the present disclosure includes an optical element according to any of the sixteenth through the twentieth aspects, wherein the optical element is a diffraction grating.

A twenty second of the present disclosure includes an optical element according to any of the sixteenth through the twenty first aspects, wherein the unit cell aspect ratio is greater than or equal to 3.

A twenty third aspect of the present disclosure includes an optical element according to any of the sixteenth through the twenty second aspects, wherein the unit cell aspect ratio is greater than or equal to 10.

A twenty forth aspect of the present disclosure includes an optical element according to any of the sixteenth through the twenty third aspects, wherein the index of refraction is greater than or equal to 2.

A twenty fifth aspect of the present disclosure includes an optical element according to any of the sixteenth through the twenty forth aspects, wherein each of the plurality of unit cells comprises a single nanostructure of the plurality of nanostructures, the single nanostructure comprising a peripheral shape that is asymmetrical along the deflection direction.

A twenty sixth aspect of the present disclosure includes an optical element according to any of the sixteenth through the twenty fifth aspects, wherein the single nanostructure of each of the plurality of unit cells comprises a first portion and second portion extending from the first portion, the first and second portions comprising overlapping portions of different pillar structures.

A twenty seventh aspect of the present disclosure includes an optical element according to any of the sixteenth through the twenty sixth aspects, wherein each of the plurality of unit cells comprises: a first nanostructure having a first cross-sectional shape; and a second nanostructure having a second cross-sectional shape, the first nanostructure being separated from the second nanostructure by a gap extending in the deflection direction.

A twenty eighth aspect of the present disclosure includes an optical element according to any of the sixteenth through the twenty seventh aspects, wherein the first and second nanostructures of each of the plurality of unit cells comprise the same cross-sectional shape, but have different cross-sectional areas.

A twenty ninth aspect of the present disclosure includes an optical element according to any of the sixteenth through the twenty eighth aspects, wherein the second nanostructure of each of the plurality of unit cells comprises a truncated version of the first nanostructure.

A thirtieth aspect of the present disclosure includes a method of scattering light at a deflection angle, the method comprising: directing an optical signal towards an optical metasurface comprising a plurality of nanostructures comprising a plurality of unit cells; and scattering the optical signal off a unit cell of the plurality of unit cells, the unit cell comprising a unit cell aspect ratio defined by a length of a nanostructure of the unit cell divided by a minimum cross-sectional dimension of the nanostructure. The unit cell aspect ratio is greater than or equal to 3 so as to generate a plurality of high order multipole resonances to deflect light at a wavelength of the optical signal in an off-normal deflection direction at a deflect angle that is greater than or equal to 50°.

A thirty first aspect of the present disclosure includes a method according to the thirtieth aspect, wherein the unit cell aspect ratio is greater than or equal to 10.

A thirty second aspect of the present disclosure includes a method according to the thirtieth through the thirty first aspects, wherein: the nanostructure of the unit cell is constructed of a material having an index of refraction; and a product of the unit cell aspect ratio and the index of refraction is greater than or equal to 8.

A thirty third aspect of the present disclosure includes a method according to the thirtieth through the thirty second aspects, wherein the nanostructure of the unit cell comprises an asymmetrical shape along the off-normal deflection direction.

A thirty fourth aspect of the present disclosure includes a method according to the thirtieth through the thirty third aspects, wherein the unit cell of the plurality of unit cell comprises a plurality of nanostructures, the plurality of nanostructures comprising an asymmetrical structure along the off-normal deflection direction.

A thirty fifth aspect of the present disclosure includes a method according to the thirtieth through the thirty fourth aspects, wherein the nanostructure of the unit cell generates a plurality of multipole resonances at wavelengths not corresponding to the wavelength of the optical signal.

A thirty sixth aspect of the present disclosure includes a method according to the thirtieth through the thirty fifth aspects, wherein the light of the optical signal deflected in the off-normal deflection direction comprises a single diffracted order of the optical signal.

A thirty seventh aspect of the present disclosure includes a method according to the thirtieth through the thirty sixth aspects, wherein the light of the optical signal deflected is deflected in the deflection direction at an absolute deflection efficiency of greater than or equal to 70%.

It is to be understood that both the foregoing general description and the following detailed description are merely exemplary and are intended to provide an overview or framework to understand the nature and character of the claims. Additional features and advantages will be set forth in the detailed description which follows, and in part will be readily apparent to those skilled in the art from the description or recognized by practicing the embodiments as described in the written description and claims hereof, as well as the appended drawings.

BRIEF DESCRIPTION OF THE DRAWINGS

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure, in which.

DETAILED DESCRIPTION

Figure 1A:
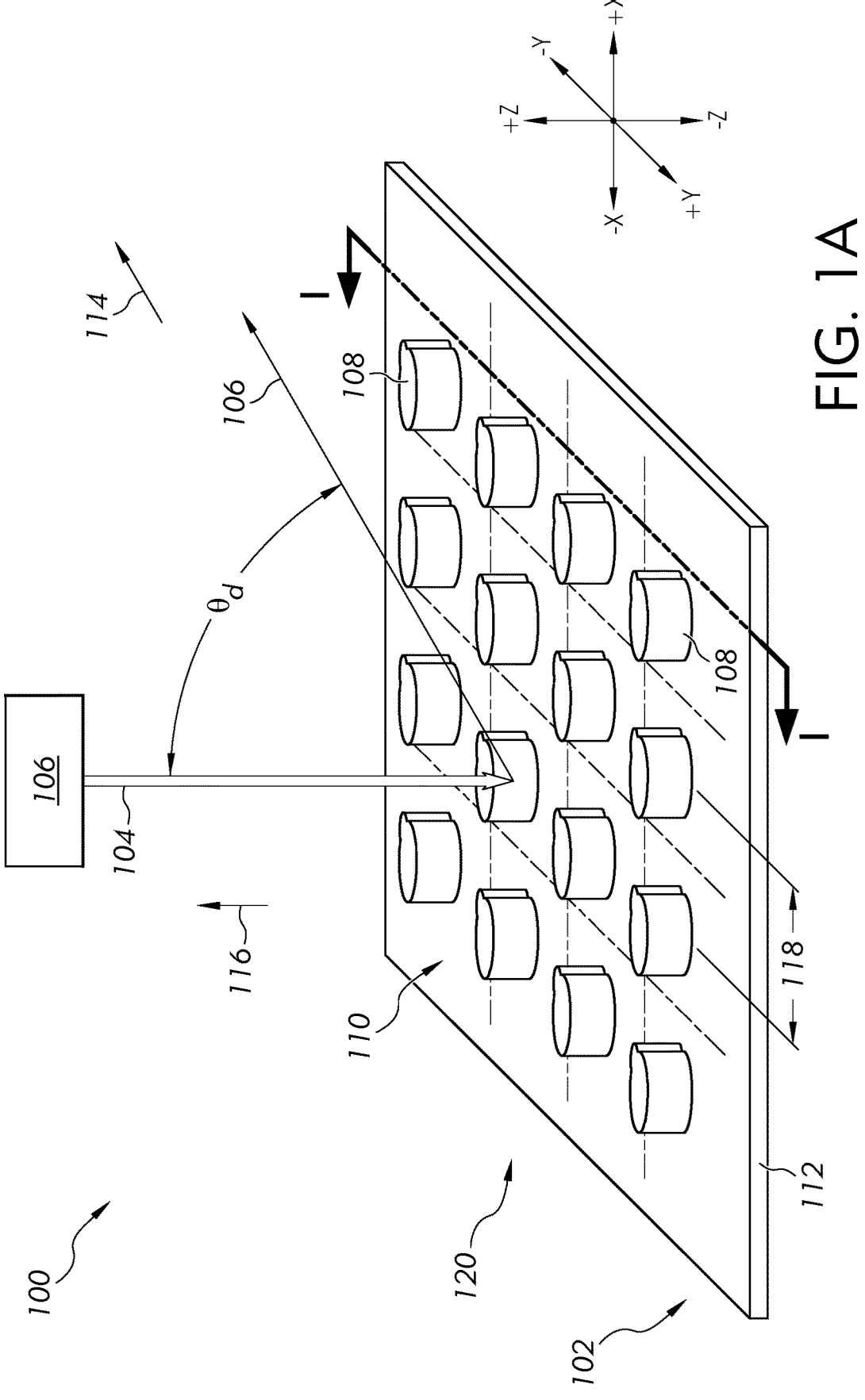
FIG. 1A schematically depicts an optical system comprising an optical metasurface with a plurality of asymmetrical unit cells, with each unit cell comprising a high aspect ratio nanostructure, according to one or more embodiments described herein.

Reference will now be made in detail to embodiments of optical metasurfaces that are structured to deflect light in a deflection direction that varies from an un-scattered direction of the light (e.g., a direction the light would travel if reflected by the optical metasurface or transmitted through the optical metasurface without scattering) by a relatively large deflection angle (e.g., greater than or equal to 50 degrees). The optical metasurfaces described herein comprise a plurality of nanostructures extending from a surface of a substrate that are arranged in a plurality of unit cells. Each of the plurality of unit cells comprises a dimension in a plane of deflection (e.g., a plane including both incidental light and scattered light) such that the plurality of unit cells support scattering of the incidental light with only a single diffraction order in the deflection direction. Each of cells comprises a unit cell aspect ratio, defined by a height of a nanostructure of the unit cell divided by a minimum cross-sectional dimension of the nanostructure, of greater than or equal to 3. The nanostructures of each unit cell may be constructed of a material having an index of refraction, and the product of the index of refraction and the unit cell aspect ratio of each unit cell is greater than or equal to 8. Such high aspect ratio, high index nanostructures facilitate high order multipolar scattering responses (e.g., toroidal dipole modes, quadripolar modes, octupolar modes, etc.) being induced in the nanostructure of each unit cell. Such high order multipolar scattering responses possess radiation patterns that emit light at angles off-normal to the substrate Through careful design of the unit cells using nanostructures having pre-determined shapes, unwanted multipole modes (e.g., dipole modes), emitting radiation at angles that differ from the deflection direction, may be reduced or eliminated, leading to large deflection efficiencies of greater than or equal to 70%.

To induce a high order multipolar scattering response that radiates light in the desired deflection direction, the nanostructures of the plurality of unit cells of the optical metasurfaces described herein comprise asymmetrical nanostructure arrangements. The asymmetrical nanostructure arrangements comprise an asymmetrical structure of one or more nanostructures of the unit cell. The asymmetrical structure is asymmetrical along the deflection direction. Such asymmetry along the deflection direction may generate phased oscillations of displacement currents within the one or more nanostructures of each unit cell that excites a combination of high order multipolar resonance modes having an asymmetrical scattering cross the section, leading to emission in the deflection direction at the relatively high efficiencies described herein.

The optical metasurfaces of the present disclosure may be fabricated to achieve high deflection efficiencies (e.g., greater than 70%) at deflection angles of greater than or equal to 50°, representing significant improvements over existing metasurface-based deflectors. For example, some existing metasurface-based binary gratings typically only deflect light at large deflection angles at efficiencies of less than or equal to 50%. The optical metasurfaces described herein may be tailored to any wavelength in the visible and near-infrared spectrum. As such, the optical metasurfaces described herein may lead to improvements in a wide range of applications, such as head-up displays in augmented reality headsets, LIDAR detectors, optical fiber multiplexing devices, flat optics for high numerical aperture imaging, and microscopy.

As used herein, the term "nanostructure" encompasses features (e.g., pillars, trenches, or the like) that comprise a cross-sectional dimension that is less than or equal to a wavelength of electromagnetic radiation incident thereon. The nanostructures of the metasurfaces described herein may be formed of a dielectric material having a refractive index that differs from a material (e.g., a cladding layer or a substrate) that surrounds the nanostructures.

FIG. 1A schematically depicts an optical system 100 comprising an optical metasurface 102. The optical metasurface 102 is positioned to deflect incoming light 104 emitted by a radiation source 106. In embodiments, the radiation source 106 emits the incoming light 104 comprising a wavelength $\lambda$. In embodiments, the wavelength $\lambda$ is in the visible spectrum (e.g., greater than or equal to 400 nm and less than or equal to 700 nm) or the near infrared spectrum (e.g., greater than or equal to 700 nm and less than or equal to 4 µm). In embodiments, the incoming light 104 is linearly polarized (e.g., in the X-Z plane depicted in FIG. 1A), though embodiments are also contemplated where the incoming light 104 has alternative polarizations (e.g., linearly polarized in the Y-Z plane depicted in FIG. 1B, non-polarized, etc.). The nature of the radiation source 106 may vary depending on the implementation. For example, in embodiments, the radiation source 108 comprises a laser or other light source. In embodiments, the radiation source 106 comprises light scattered from an object or the external environment of the optical system 100. The radiation source 106 may comprise any object reflecting, scattering, or transmitting electromagnetic radiation to be manipulated by the optical metasurface 102.

The optical metasurface 102 is structured to scatter the incoming light 104 such that a deflected portion 106 of the incoming light 104 is re-directed in a deflection direction 114 extending at a deflection angle $\Theta_d$ from an un-scattered direction 116. In the depicted embodiment, the optical metasurface 102 is configured as a reflective metasurface, in which the incoming light is at least partially reflected back towards the radiation source 106. As such, the un-scattered direction 116 represents a situation where the incoming light 104 is reflected by a purely reflective surface not modifying the phase front profile of the incoming light 104. While, in the embodiments described herein, the incident light 104 is normally incident on the optical metasurface 102, it should be understood that embodiments are also contemplated where the incoming light 104 is incident on the optical metasurface 102 at an off-normal angle. While the embodiment depicted in FIG. 1A is implemented as a reflective metasurface, it should be understood that embodiments are also contemplated where the optical metasurface 102 is a transmissive metasurface, where the un-scattered direction 116 is a linear extension of the initial propagation direction of the incoming light 104 (i.e., through the optical metasurface). As described herein, in embodiments, the deflection angle $\Theta_d$ is greater than or equal to 50°.

To scatter the incoming light 104 and modify the propagation direction thereof, the optical metasurface 102 comprises a plurality of nanostructures 108 extending from a surface of a substrate 112. The plurality of nanostructures 108 are structures having sizes (e.g., cross-sectional dimensions in the X-Y plane depicted in FIG. 1A) that are less than the wavelength $\lambda$ of the incoming light 104. The plurality of nano structures 108 are constructed of dielectric material (e.g., silicon, titanium oxide) having an index of refraction n. In embodiments, the index of refraction n of the plurality of nanostructures 108 is greater than or equal to 2.0. As used herein, the term "index of refraction" is used to refer to the refractive index of a material at the particular wavelength $\lambda$ of that implementation. In embodiments, for example, the incoming light 104 may have a wavelength $\lambda$ of 550 nm, and so the plurality of nanostructures 108 may have an index of refraction n that is greater than or equal to 2.0 at 550 nm. In embodiments, the plurality of nanostructures 108 are surrounded by a cladding material 120 having a refractive index $n_c$ that differs from that of the plurality of nanostructures. In the depicted embodiment, the cladding material 120 is air, though embodiments where the cladding material 120 is a solid material (e.g., a polymer-based material or an oxide-containing dielectric) are contemplated and within the scope of the present disclosure.

The plurality of nanostructures 108 may be formed on or within the substrate 112. In the depicted embodiment, the plurality of nanostructures 108 are positive features where a layer is deposited on the substrate 112 and subsequently patterned (e.g., via nanolithography) to form the plurality of nano structures 108. Embodiments are also envisioned where the plurality of nanostructures 108 are negative features, in which the substrate 112 (or a cladding layer disposed thereon) are patterned with a plurality of cavities or openings, and the plurality of nanostructures are subsequently deposited in the plurality of cavities or openings. In embodiments, the plurality of nanostructures 108 comprise deterministic shapes. That is, external surfaces of the plurality of nanostructures 108 may follow predetermined geometric contours (e.g., have fixed shapes) based on the design. This is in contrast with some existing metasurface fabrication techniques, which rely on free-form geometries that are topologically optimized to have spatially varying structures. Such free form geometries are difficult to model and fabricate.

Figure 3:
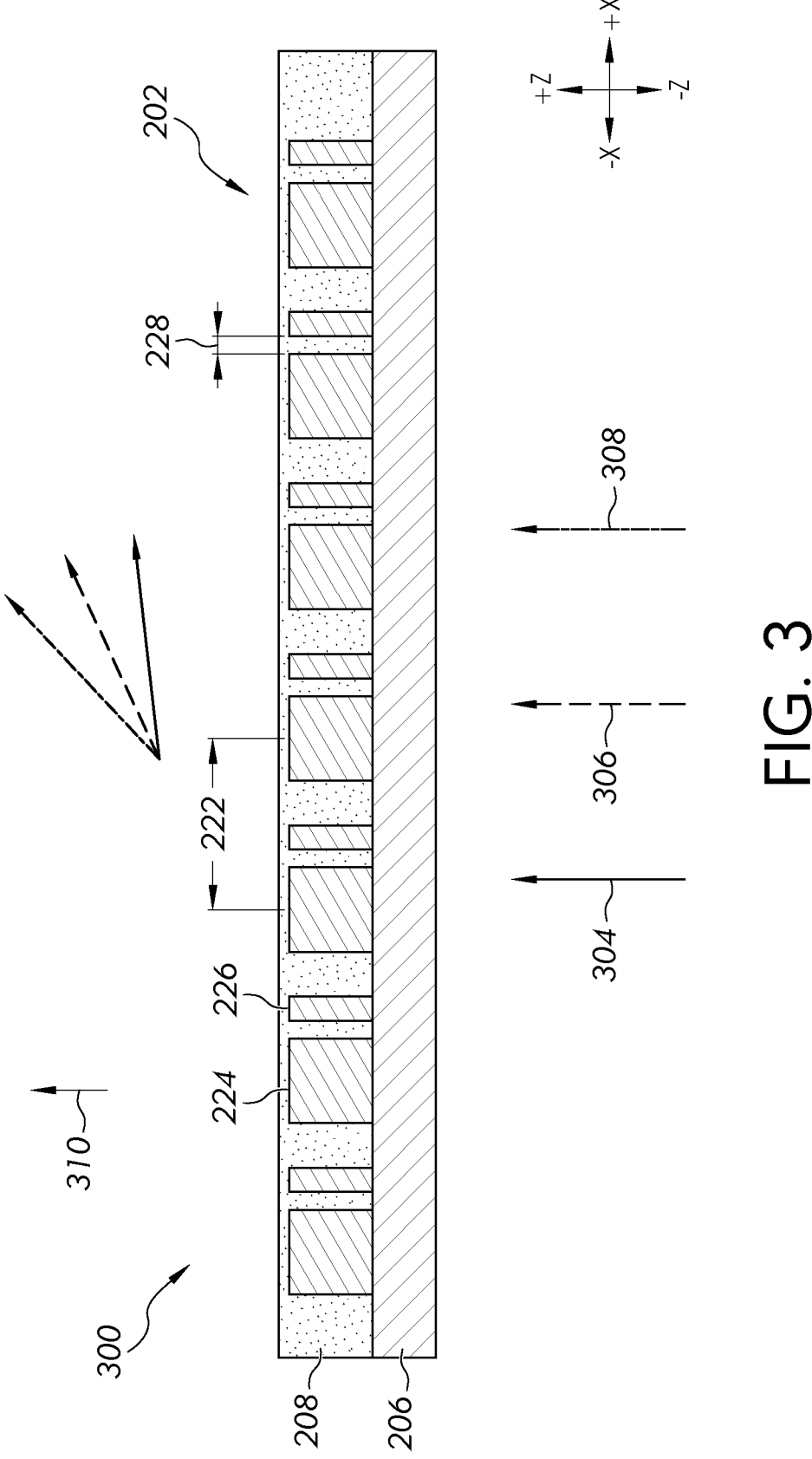
FIG. 3 schematically depicts a transmissive optical metasurface, according to one or more embodiments described herein.

Referring still to FIG. 1A, the plurality of nanostructures 108 are arranged on the substrate 112 in a plurality of unit cells 110. In embodiments, the plurality of unit cells 110 are disposed in a structurally repeating lattice on the substrate 112. In embodiments, each of the plurality of unit cells 110 has the same shape and arrangement of nanostructures therein, though embodiments are also contemplated in which the plurality of unit cells 110 have a spatially varying structure (e.g., both in terms of size and nanostructure arrangement). Each of the plurality of unit cells 110 comprises a dimension 118 in a plane (e.g., the X-Z plane depicted in FIG. 1A) in which both the incoming light 104 and the deflected portion 106 extend. In embodiments, the dimension 118 is determined based on the desired deflection angle $\Theta_d$. According to the grating equation, $$d^*\sin(\Theta_d)=m^*\lambda_{eff} \tag{1}$$

where d is the magnitude of the dimension 118, m is an integer corresponding to the diffraction order used to scatter the incoming light 104 in the deflection direction 114, and $\lambda_{eff}$ is the effective wavelength of the incoming light in the medium of propagation outside of the plurality of nanostructures 108, determined by $\lambda/n_s$, where $n_s$ is the refractive index of the surrounding medium through which output light propagates after interacting with the plurality of nanostructures (e.g., when a reflective metasurface is used, $n_s$ is the refractive index of the substrate 112 because the light is transmitted therethrough after interacting with the plurality of nanostructures 108, when a transmissive metasurface, as described herein with respect to FIG. 3, is used, $n_s$ is the refractive index of the cladding 120). In embodiments, the dimension 118 (e.g., d in equation 1 above) is selected such that only the first diffraction order exists, such that the incoming light 104 is scattered in the deflection direction 114. In embodiments, to facilitate utilization of only a single diffraction order, d is selected such that a value of m that is greater than or equal to 1 and less than 2 satisfies equation 1 above.

Figure 1B:
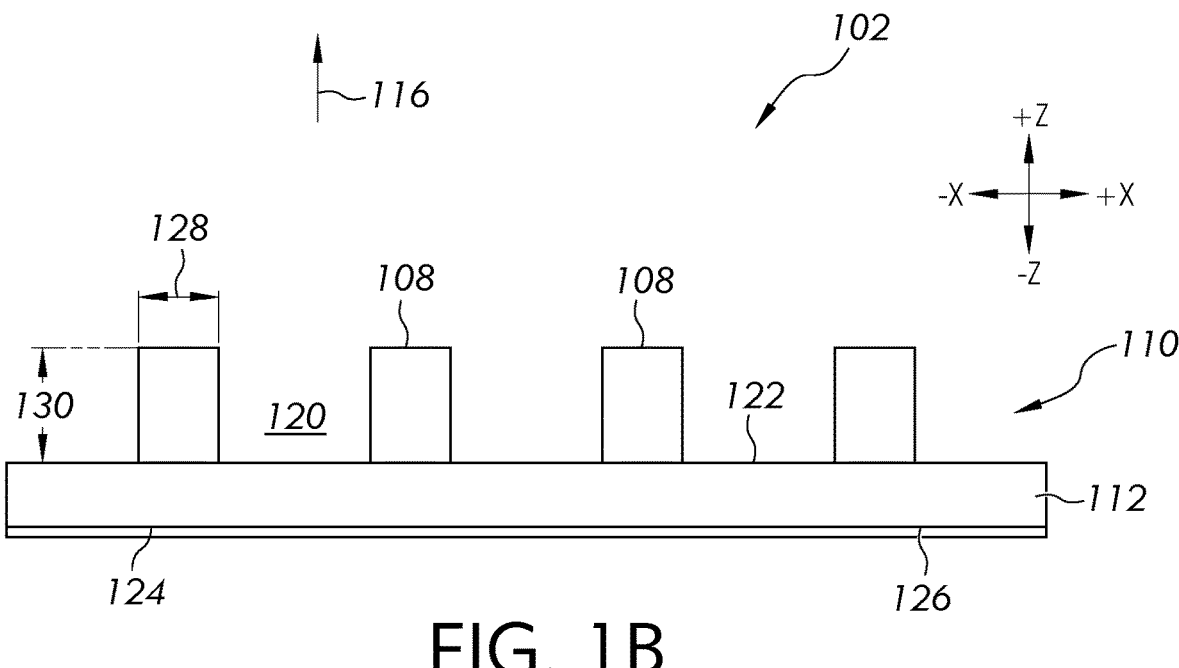
FIG. 1B schematically depicts a cross-sectional view of the optical metasurface through the line I-I depicted in FIG. 1A, according to one or more embodiments described herein.

Various aspects of the plurality of unit cells 110 are designed to achieve relatively high deflection efficiencies at large deflection angles $\Theta_d$ of greater than or equal to 50°. For example, FIG. 1B schematically depicts a cross-sectional view of a subset of the plurality of unit cells 110 through the line I-I depicted in FIG. 1A. As depicted in FIG. 1B, the substrate 112 comprises a first surface 122 and a second surface 124. The plurality of nanostructures 108 extend from the first surface 122 and comprise a height 130 in a direction normal to the first surface 122 (e.g., in the Z-direction depicted in FIG. 1B). The optical metasurface 102 also comprises a reflective layer 126 disposed on the second surface 124 of the substrate 112. The reflective layer 126 may reflect the incoming light 102 after interaction with the plurality of nanostructures 108 in the deflection direction 104 to facilitate operation of the optical metasurface 102 in a reflection mode. The reflective layer 126 may be omitted in embodiments where the optical metasurface 102 is implemented as a transmissive metasurface.

The height 130 of the plurality of nanostructures 108 is selected such that the incoming light 104 excites high order multipole resonances in the plurality of nanostructures 108. Most nanostructures exhibit an electrical dipolar resonance when illuminated. Such dipole resonances have dipole vectors aligned in parallel with the polarization of the incoming light 104, such that excitation of the electric dipole resonance induces scattering in the un-scattered direction 116. In embodiments where the refractive index n of the plurality of nanostructures is greater than or equal to 2, the height 130 may be selected such that the height is greater than or equal to twice the effective wavelength $\lambda_{eff}$ of the incoming light 104 propagating through the plurality of nanostructures 108, determined by $\lambda/n$). When the height 130 is $2^*\lambda_{eff}$, a magnetic dipole is excited, as the polarization of the incident electric field of the incoming light 104 is antiparallel at the ends of each of the plurality of nanostructures 108, which leads to strong displacement currents and a magnetic dipolar response. When the height is greater than $2^*\lambda_{eff}$ higher order multipole resonances may be excited within each of the plurality of nanostructures 108 as a result of the distribution of nodes and antinodes in the electric field present therein. Such higher order multipole resonance modes have radiation patterns that emit light in an off-normal direction. By careful design of the structure of each of the plurality of nanostructures 108, a combination of multipole resonances may be excited to cause the plurality of nanostructures 108 in combination to emit the scattered portion 106 (see FIG. 1A) in the deflection direction 114, which is compatible/consistent with $\Theta_d$ in equation 1.

Excitation of such high order multipole modes is further facilitated by selection of a minimum cross-sectional dimension 128 of the plurality of nanostructures 108. As used herein, the term "minimum cross-sectional dimension" of a unit cell is used to describe the cross-sectional length of a nanostructure (or a portion thereof) disposed within the unit cell in a plane extending parallel to the substrate on which a metasurface is formed. The minimum cross-sectional dimension is measured as the minimum width of a cross-section of a nanostructure (or a portion thereof following a predetermined geometric contour) extending through a geometric center of the nanostructure (or the portion thereof) in a plane parallel to the substrate. When the unit cell being described includes multiple distinct nanostructures (e.g., nanostructures that are separated from one another), the term "minimum cross-sectional dimension" describes the width of the smaller unit cell.

Figure 1C:
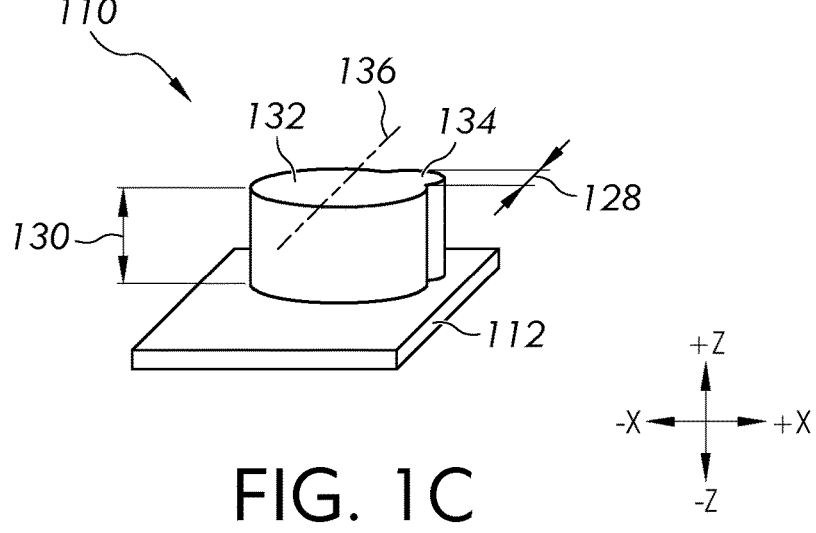
FIG. 1C schematically depicts one of the plurality of asymmetrical unit cells of the optical metasurface depicted in FIG. 1A, according to one or more embodiments described herein.

In the example depicted in FIGS. 1A, 1B, and 1C, each of the plurality of unit cells 110 comprises a single one of the plurality of nanostructures 108. FIG. 1C depicts a perspective view of one of the plurality of unit cells 110 of the optical metasurface 102 depicted in FIG. 1A. Each of the plurality of nanostructures 108 comprises a first portion 132 and a second portion 134 (see FIG. 1C). The first portion 132 and second portion 134 may follow different pre-determined geometric contours. For example, in embodiments, the first portion 132 is a portion of a first cylindrical pillar having a first radius and the second portion 134 is a portion of a second cylindrical pillar having a second radius. The first and second portions 132 and 134 are joined to one another to form one of the plurality of nanostructures 108. In this example, the minimum cross-sectional dimension 128 is measured as a length of a line extending through a geometric center of the second portion 134 in a plane parallel to the substrate 112.

As used herein, the term "unit cell aspect ratio" of a particular unit cell is defined by the height of the one or more nanostructures disposed in the unit cell divided by the unit cell's minimum cross-sectional dimension. In embodiments, to facilitate excitation of higher order multipole resonances, the plurality of unit cells 110 of the optical metasurface 102 comprise a unit cell aspect ratio that is greater than or equal to 3 (e.g., greater than or equal to 4, greater than or equal to 5, greater than or equal to 6, greater than or equal to 7, greater than or equal to 8, greater than or equal to 9, greater than or equal to 10, greater than or equal to 15). In embodiments, excitation of high order multipole resonances in the deflection direction 114 is further facilitated by the plurality of unit cells 110 comprising a product of the refractive index n of the plurality of nanostructures 108 and the unit cell aspect ratio (i.e., n*unit cell aspect ratio) that is greater than or equal to 8 (e.g., greater than or equal to 9, greater than or equal to 10, greater than or equal to 15). Such a product between the unit cell aspect ratio and the refractive index n ensures a relatively high number of multipole resonances are excited and may remove a portion of the incoming light 104 scattering, resulting in higher scattering efficiencies in the scattering direction 114, which is compatible/consistent with $\Theta_d$ in equation 1.

Referring now to FIG. 1C, the plurality of unit cells 110 may comprise asymmetrical nanostructure arrangements to facilitate emission of scattered light in the deflection direction 114 over other directions. As depicted in FIG. 1C, each one of the plurality of unit cells 110 comprises one of the plurality of nanostructures 108. The asymmetrical nano-structure arrangement of each one of the plurality of unit cells 110 thus coincides with the asymmetry in the structure of the nanostructure contained therein. In embodiments, the plurality of unit cells 110 are asymmetrical along the deflection direction 114. For example, the plurality of nanostructures 108 may be arranged on the substrate 112 such that they are asymmetrical in a deflection plane containing both the incoming light 104 and the scattered portion 106. In embodiments, the plurality of nanostructures 108 comprise an axis of asymmetry 136 extending in a direction perpendicular to the deflection direction 114 and parallel to the substrate 112. The axis of asymmetry 136 may extend through a center of mass of a cross-section of one of the plurality of nanostructures 108. That is, if a cross-section of one of the plurality of nanostructures 108 was folded over itself along the axis of asymmetry 134, the portions of the nanostructures lying on either side of the axis of asymmetry 136 (when unfolded) would not entirely overlap with one another. Such asymmetric structure in the deflection plane facilitates the incoming light 104 inducing an asymmetric displacement current distribution in each of the plurality of unit cells, which in turn facilitates excitation of a combination of high order multipole modes that radiate in the deflection direction 114.

In embodiments, the plurality of nanostructures 108 are symmetrical about an axis extending perpendicular to the axis of asymmetry 136. That is, the asymmetry of the plurality of nanostructures 108 lies only along the deflection direction 114. Such embodiments may be optimized for linearly polarized incoming light 104 having a polarization in the X-Z plane depicted in FIG. 1A. It should be understood that unit cells with multiple axes of asymmetry are contemplated and within the scope of the present disclosure. Such embodiments may efficiently deflect light having multiple polarizations. For example, in one embodiment, each of the plurality of nanostructures 108 may comprise three portions: a large portion and two smaller portions extending therefrom, with lines connecting a center of the large portion with centers of each of the two smaller portions extending perpendicularly to one another. Such a structure is effectively asymmetrical in two-directions, rendering scattering in the deflection direction 114 efficient for two perpendicular polarizations of incoming light 104. The nanostructures of the metasurfaces described herein may include any number of portions or separate nanostructures, being asymmetrical along any number of directions to facilitate operation with any number of polarizations of incoming light 104.

Figures 2A, 2B, 2C:
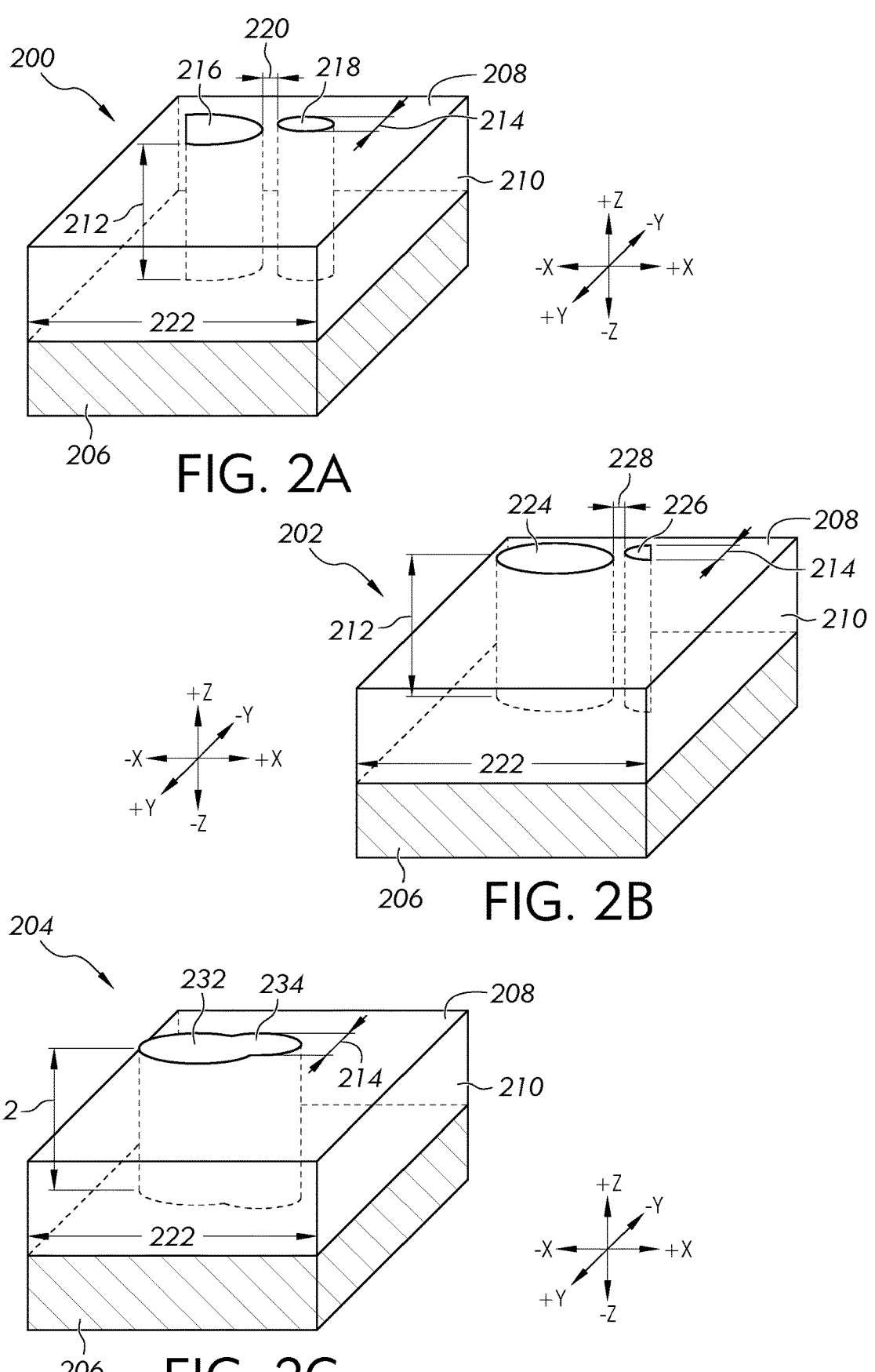
FIG. 2A schematically depicts an asymmetrical unit cell comprising two nanostructures that may be used to construct an optical metasurface, according to one or more embodiments described herein.
FIG. 2B schematically depicts another asymmetrical unit cell comprising two nanostructures that may be used to construct an optical metasurface, according to one or more embodiments described herein.
FIG. 2C schematically depicts an asymmetrical unit cell comprising an asymmetrical nanostructure that may be used to construct an optical metasurface, according to one or more embodiments described herein.

While the embodiment depicted in FIGS. 1A, 1B, and 1C is a reflective optical metasurface 102 with only a single one of the plurality of nanostructures 108 in each of the plurality of unit cells 110, it should be appreciated that alternative embodiments, with varying unit cell structures, are contemplated and within the scope of the present disclosure. For example, FIGS. 2A, 2B, and 2C schematically depict three unit cells 200, 202, and 204 that may be used in the formation of transmissive metasurfaces in accordance with the present disclosure. Each of the unit cells 200, 202, and 204 comprises a substrate 206 and a cladding layer 208 disposed on a surface 210 of the substrate 206. In embodiments, the substrate 206 comprises a silicon-on-insulator substrate or other suitable dielectric material. The cladding layer 208 encapsulates the one or more nanostructures contained in each of the unit cells 200, 202, and 204 and is constructed of a material with an index of refraction $n_c$ at a wavelength $\lambda$ of interest (e.g., the wavelength associated with the incoming light to be deflected by the incorporating optical metasurface). In embodiments, the greater refractive index contrast between the cladding layer 208 and the nanostructures incorporated into each of the unit cells 200, 202, and 204, the greater deflection efficiencies achieved at relatively large deflection angles. Accordingly, in embodiments, $n_c$ is less than or equal to 1.5 (e.g., less than or equal to 1.3, less than or equal to 1.2, less than or equal to 1.1). In embodiments, the cladding layer 208 is air. In embodiments, the cladding layer 208 is constructed of a polymeric material or other suitable dielectric oxide.

The unit cells 200, 202, and 204 each comprise nano-structures having a height 212 and minimum cross-sectional dimension 214 meeting the various constraints described herein with respect to the optical metasurface 102 depicted in FIGS. 1A, 1B, and 1C. For example, in embodiments, the nanostructures may be constructed of a dielectric material (e.g., amorphous silicon, titanium dioxide) having a refractive index n that is greater than or equal to 2. The unit cell aspect ratio of each of the unit cells 200, 202, and 204 (e.g., calculated by dividing the height 212 by the minimum cross-sectional dimension 214) may be greater than or equal to 3. In embodiments, a product of the refractive index n of the nanostructures and the unit cell aspect ratio is greater than or equal to 8. As described herein, meeting such constraints facilitates incoming light inducing displacement current distributions in each of the unit cells 200, 202, and 204 that lead to excitement of high order multipole modes in the nanostructures, emitting radiation in an off-normal direction.

In the depicted embodiments, each of the unit cells 200, 202, and 204 is structured to deflect incoming light that is normally incident on the substrate 206 (e.g., in the negative Z-direction depicted in FIGS. 2A, 2B, and 2C) in a deflection direction, which is compatible/consistent with $\Theta_d$ in equation 1. To facilitate high deflection efficiencies in the deflection direction, the nanostructures of each of the unit cells 200, 202, and 204 comprise an asymmetrical arrangement that is asymmetrical along the deflection direction (e.g. in the positive or negative X-direction depicted in FIGS. 2A, 2B, and 2C). Such asymmetrical structures facilitate each of the nanostructures emitting near field radiation patterns in the desired deflection direction.

The unit cells 200, 202, and 204 vary from one another in the unit cell arrangements that they contain. For example, the unit cell 200 depicted in FIG. 2A comprises a first nanostructure 216 and a second nano structure 218. The first and second nanostructures 216 and 218 comprise different cross-sectional shapes and are separated from one another by a gap 220 extending in the deflection direction such that the nanostructure arrangement of the unit cell 200 is asymmetrical along the deflection direction. In embodiments, one of the first and second nanostructures 216 and 218 comprises a truncated version of the other. For example, as depicted in FIG. 2A, the second nanostructure 218 comprises a substantially cylindrical shape with an elliptical cross-section, with the major axis of the ellipse extending in the deflection direction. The first nanostructure 216 comprises a truncated (e.g., half) cylindrical pillar such that the first nanostructure 216 comprises a portion of an elliptical pillar having a major axis that is larger than that of the second nanostructure 218. Such a structure provides the requisite asymmetry to excite a desired combination of high order multipole modes that emit light in the deflection direction.

The unit cell 200 further comprises a dimension 222 in the deflection direction. As described herein, the magnitude of the dimension 222 may be selected such that only a single diffraction order (e.g., a first order) is scattered by the incorporating metasurface in the deflection direction. As will be appreciated, various parameters of the unit cell 200 (e.g., the sizes of the first and second nanostructures 216 and 218, the height 212, the dimension 222, the size of the gap 220) may vary as a function of aspects of the incoming light (e.g., wavelength, polarization, incoming direction) and the desired deflection angle.

The unit cell 202 depicted in FIG. 2B comprises a first nanostructure 224 and a second nanostructure 226. The first and second nanostructures 224 and 226 comprise different cross-sectional shapes and are separated from one another by a gap 228 extending in the deflection direction such that the nanostructure arrangement of the unit cell 202 is asymmetrical along the deflection direction. As depicted in FIG. 2B, the first nanostructure 224 comprises a substantially cylindrical shape with an elliptical cross-section, with the major axis of the ellipse extending in the deflection direction. The second nanostructure 226 comprises a truncated (e.g., half) cylindrical pillar such that the second nanostructure 226 comprises a portion of an elliptical pillar having a major axis that is smaller than that of the first nanostructure 224. As demonstrated by a comparison with the unit cell 200 depicted in FIG. 2A, nanostructures following similar geometric contours may be separated from one another along the deflection direction to establish the asymmetry along the deflection direction needed to excite a desired combination of high order multipole modes.

The unit cell 204 depicted in FIG. 2C comprises a single nanostructure 230. In embodiments, the single nanostructure 230 comprises a first portion 232 following a first geometric contour and a second portion 234 following a second geometric contour. For example, in embodiments, the first portion 232 may follow a similar geometric contour as the first nanostructure 224 of the unit cell 202 depicted in FIG. 2B. The second portion 234 may follow a similar geometric contour as the second nanostructure 226 of the unit cell 202, and comprise a truncated elliptical pillar. The second portion 234 extends continuously from the first portion 232 such that the single nanostructure 230 comprises an asymmetrical shape along the deflection direction. While the preceding examples include unit cells with one or two nanostructures per unit cell, it should be appreciated that embodiments containing more than two unit cells (e.g., 3, 4, 5, 6 nanostructures per unit cell) are contemplated and within the scope of the present disclosure. Any unit cell structure including large aspect ratio nanostructures with an asymmetrical arrangement may be used in accordance with the present disclosure.

FIG. 3 schematically depicts a cross-sectional view of a transmissive metasurface 300 constructed from a plurality of the unit cells 202 described herein with respect to FIG. 2B. As depicted, a plurality of the unit cells 202 are disposed on the substrate 206 in a periodically repeating arrangement such that corresponding positions in each of the plurality of the unit cells 202 are separated by the dimension 222 in a deflection direction (the positive X-direction in the depicted example). The first and second nanostructures 224 and 226 are separated from one another the deflection direction by gap 228. The dimension 222 is selected such that first diffraction orders of incoming light rays 304, 306, and 308 are deflected by different deflection angles from an un-scattered direction 310. The incoming light ray 304 may have a first wavelength $\lambda_1$, the incoming light ray 306 may have a second wavelength $\lambda_2$, and the incoming light ray 308 may have a third wavelength $\lambda_3$. In embodiments, the first wavelength $\lambda_1$ is greater than the second wavelength $\lambda_2$, which is greater than the third wavelength $\lambda_3$, accounting for the depicted difference in deflection angle.

In embodiments, the plurality of the unit cells 202 are specifically designed to achieve a maximum deflection efficiency for incoming light having a specific incoming direction (e.g., normal to the substrate 206) and having a specific wavelength $\lambda$. That is, if one of the first, second, and third wavelengths $\lambda_1$, $\lambda_2$, and $\lambda_3$ of the incoming light rays 304, 306, and 308 depicted in FIG. 3 corresponds to a design wavelength of the optical metasurface 300, the efficiency with which that one of the incoming light rays 304, 306, and 308 is deflected at the depicted deflection angle may be higher than the other ones of the incoming light rays 304, 306, and 308. In embodiments, the plurality of unit cells 202 are designed for a plurality of distinct wavelength ranges of interest (e.g., have a bandwidth in which the deflection efficiency at a particular deflection angle is above a threshold such as 50%). In embodiments, for example, the first, second, and third wavelengths $\lambda_1$, $\lambda_2$, and $\lambda_3$ each lie within one of the wavelength ranges of interest, such that the optical metasurface 300 deflects the light rays at different deflection angles at relatively high efficiency. The optical metasurfaces described herein may be designed to achieve various combinations of deflection angles for various combinations of wavelengths, depending on the application. Additionally spatially varying structures of the unit cells described herein may be implemented to achieve metasurfaces having spatially varying responses to achieve various optical defects (e.g., spectral filtering, focusing (e.g., optical lenses), polarization multiplexing (e.g., polarization-sensitive gratings), and creation of photonic bandgaps (e.g., multi-layer or multi-dimensional gratings comprising stacked arrangements of the metasurfaces described herein).

Figure 4A:
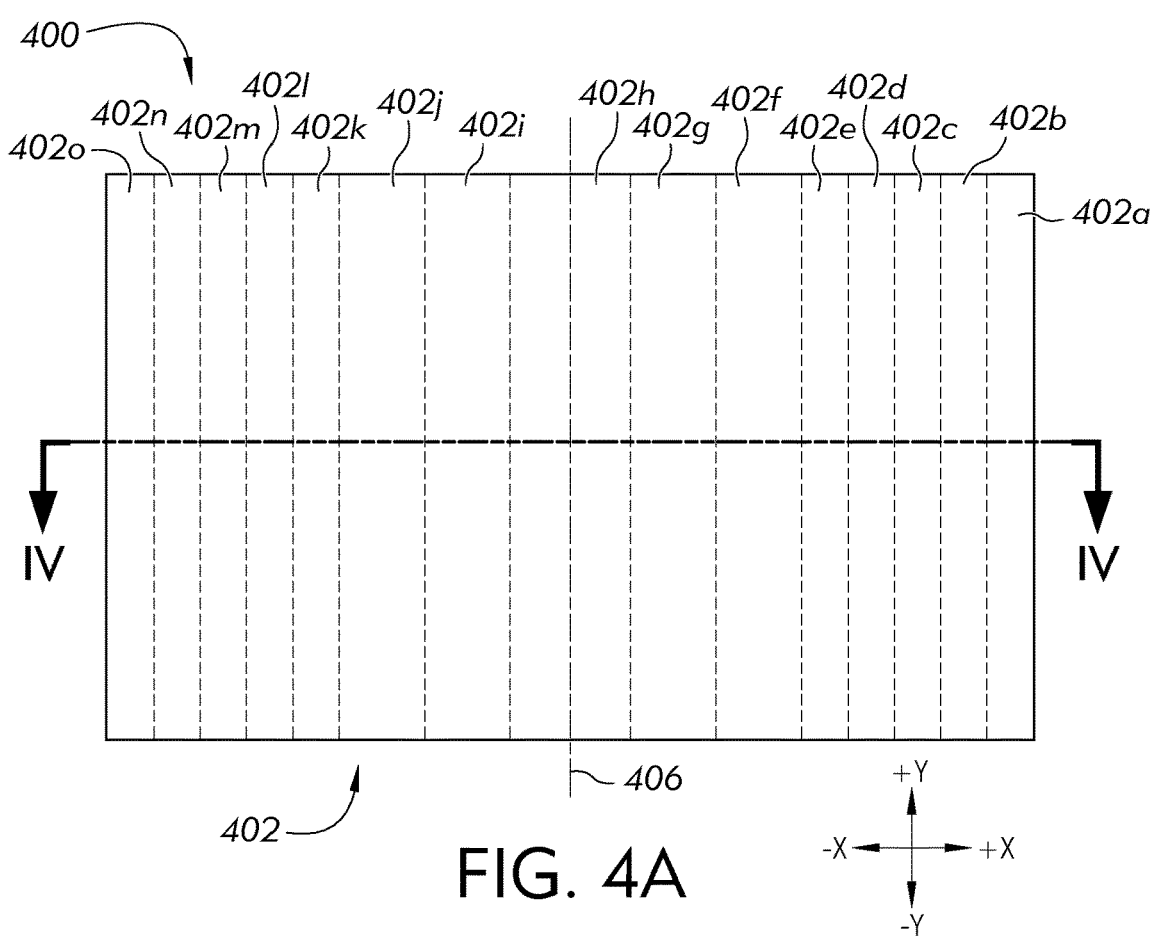
FIG. 4A schematically depicts a diffractive optical lens with a plurality of deflection zones, with each of the deflection zones configured to deflect incoming light at a different deflection angle to achieve optical focusing, according to one or more embodiments described herein.
Figure 4B:
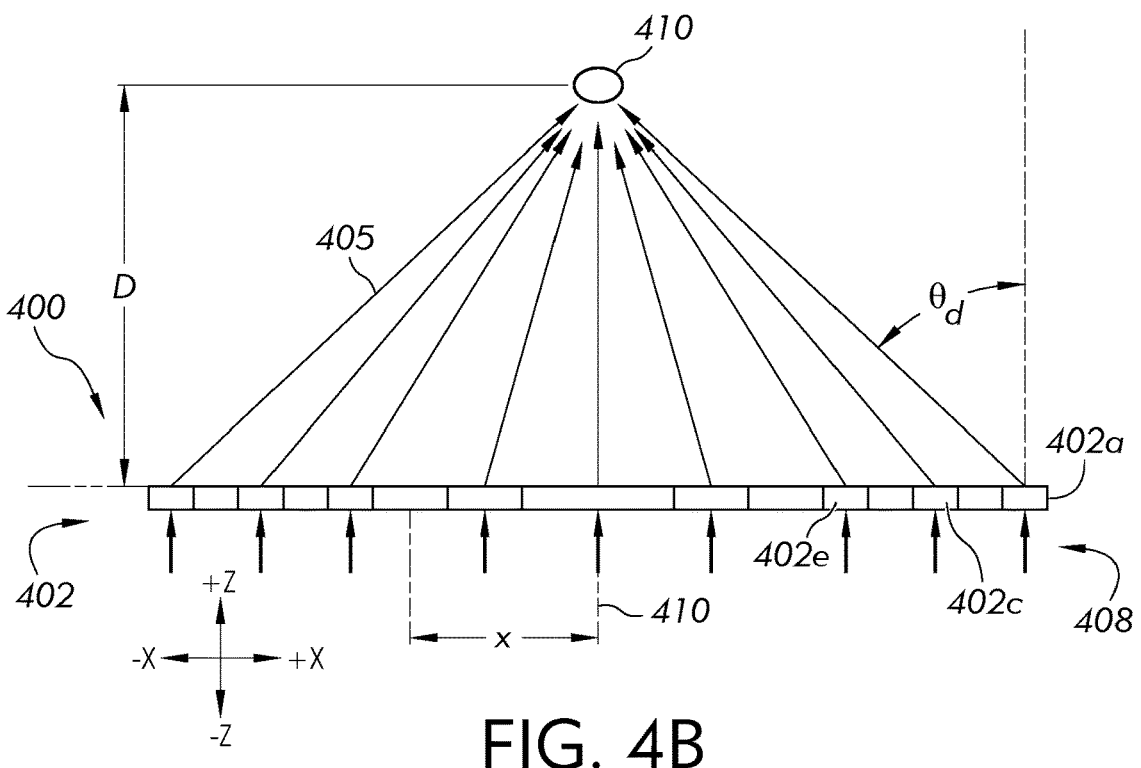
FIG. 4B schematically depicts a cross-sectional view of the diffractive optical lens depicted in FIG. 4A through the line IV-IV of FIG. 4A, according to one or more embodiments described herein.

FIGS. 4A and 4B schematically depict a diffractive cylindrical lens 400 comprising a plurality of large aspect ratio unit cells. FIG. 4A schematically depicts a plan view of the diffractive cylindrical lens 400. FIG. 4B schematically depicts a cross-sectional view of the diffractive cylindrical lens 400 through the line IV-IV depicted in FIG. 4A. As depicted in FIG. 4A, the diffractive cylindrical lens 400 comprises a plurality of deflection zones 402 (e.g., a first deflection zone 402a, a second deflection zone 402b, a third deflection zone 402c, a fourth deflection zone 402d, a fifth deflection zone 402e, a sixth deflection zone 402f, a seventh deflection zone 402g, an eighth deflection zone 402h, a ninth deflection zone 402i, a tenth deflection zone 402j, an eleventh deflection zone 402k, a twelfth deflection zone 402l, a thirteenth deflection zone 402m, a fourteenth deflection zone 402n, and a fifteenth deflection zone 402o). In embodiments, each of the plurality of deflection zones 402 comprises a different plurality of unit cells structured to deflect incoming light in a different deflection direction to achieve a desired optical effect. In embodiments, the plurality of deflection zones 402 comprises a symmetrical arrangement of unit cells about a central axis 406 of the diffractive cylindrical lens 400 to achieve focusing such that the diffractive cylindrical lens 400 focuses incoming light at a predetermined focal distance away from the diffractive cylindrical lens 400. In such embodiments, the eighth deflection zone 402h comprises a central deflection zone designed to not deflect incoming light from an un-scattered direction (e.g., the deflection zone does not include any nanostructures). The remaining deflection zones around the eighth deflection zone 402*h* may be symmetrically arranged (e.g., the nine deflection zone 402*i* has the same unit cell structure as the seventh deflection zone 402*h*, with the nanostructures being flipped 180° in orientation relative to one another to maintain symmetry about the central axis 406) to deflect incoming light on either side of the central axis 406 towards a focal point. It should be understood that the high aspect ratio unit cells described herein may also be used in non-symmetrical arrangement to create other optical elements (e.g., aspherical lenses and other aberration-corrected optics).

The dimensions of the deflection zones 402 may be selected to achieve a desired optical effect. For example, as depicted in FIG. 4B, the plurality of deflection zones 402 are designed with decreasing lengths in the deflection direction (e.g., the positive and negative X-directions depicted in FIG. 4B) to achieve a spatially varying deflection angle $\Theta_d$.) As depicted, the first deflection zone 402*a* comprises a shorter length in the deflection direction than the third deflection zone 402*c*, which is in turn shorter than the fifth deflection zone 402*e*. In embodiments, the lengths of each of the plurality of deflection zones 402 in the deflection direction correspond to the dimensions of the unit cells of nanostructures disposed therein (e.g., corresponding to the dimension 222 described herein with respect to FIGS. 2A, 2B, and 2C). As such, the lengths of each of the plurality of deflection zones 402 may directly determine the deflection angle $\Theta_d$ at which incoming light 408 incident thereon is deflected by the diffractive cylindrical lens 400. The plurality of deflection zones 402 may comprise rows of unit cells, with each unit cell in each row configured to deflect the incoming light 408 having a wavelength $\lambda$ at a particular deflection angle $\Theta_d$. In the depicted embodiments, the nanostructure arrangements of the plurality of unit cells are constructed such that each of the plurality of deflection zones 402 deflects the incoming light 408 at a different deflection angle $\Theta_d$ such that the scattered light 405 converges to a focal point 410 positioned a distance D from the diffractive cylindrical lens 400. It should be understood that differing arrangement of deflection zones may be used in the creation of other optical elements (e.g., an axicon or the like).

As depicted in FIG. 1B, geometric centers of each of the plurality of deflection zones 402 are positioned a distance x from the central axis 406 in the deflection direction. As such, the desired deflection angle for each of the plurality of deflection zones 402 to generate convergence at the focal point 410 may be calculated as $$\sin\Theta_d = \frac{x}{\sqrt{x^2 + D^2}}. \tag{2}$$

From the equation 1 above, the dimensions of each unit cell disposed in each of the plurality of unit cells provided by $$\frac{\lambda}{d} = \sin(\Theta_d), \tag{3}$$

where d is the dimension of each unit cell in the deflection direction. As such, the relationship between the distance x from the central axis 406 and the required dimension of each unit cell is given by $$d = \frac{\lambda * \sqrt{x^2 + D^2}}{x}. \tag{4}$$

Thus, by designing the plurality of deflection zones 402 to have unit cells having different dimensions d in accordance with equation 4 above, a cylindrical lens focusing effect may be achieved. The diffractive cylindrical lens 400 is designed in the angular domain with the spatial domain of the unit cells not being constant. This is distinct from some existing meta-lenses, which hold the spatial size of the unit cell constant while varying the nanostructures therein to achieve a desired phase profile.

Figure 4C:
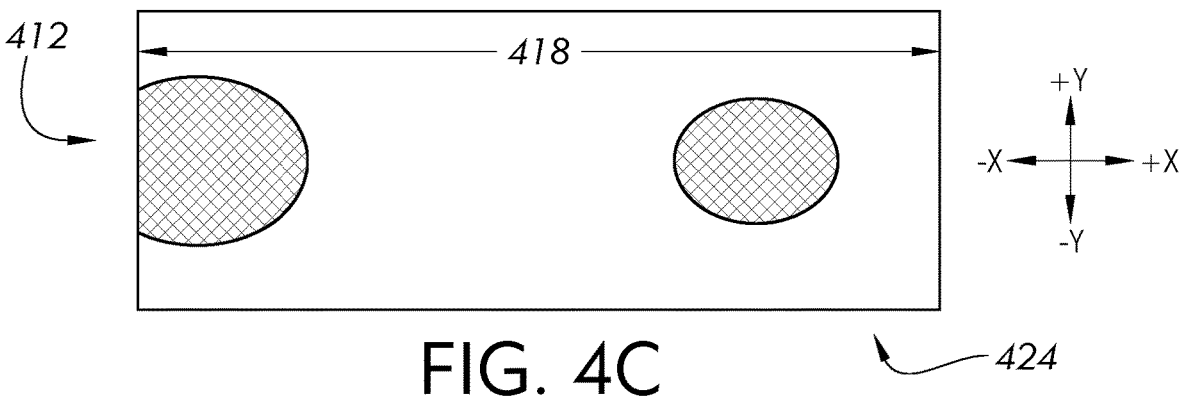
FIG. 4C depicts a unit cell of one of the deflection zones of the diffractive optical lens depicted in in FIG. 4A, according to one or more embodiments described herein.
Figure 4D:
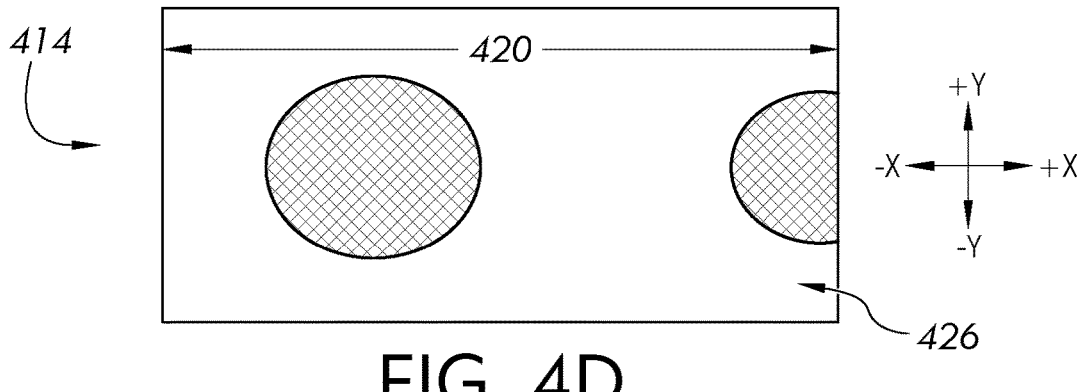
FIG. 4D depicts a unit cell of one of the deflection zones of the diffractive optical lens depicted in in FIG. 4A, according to one or more embodiments described herein.
Figure 4E:
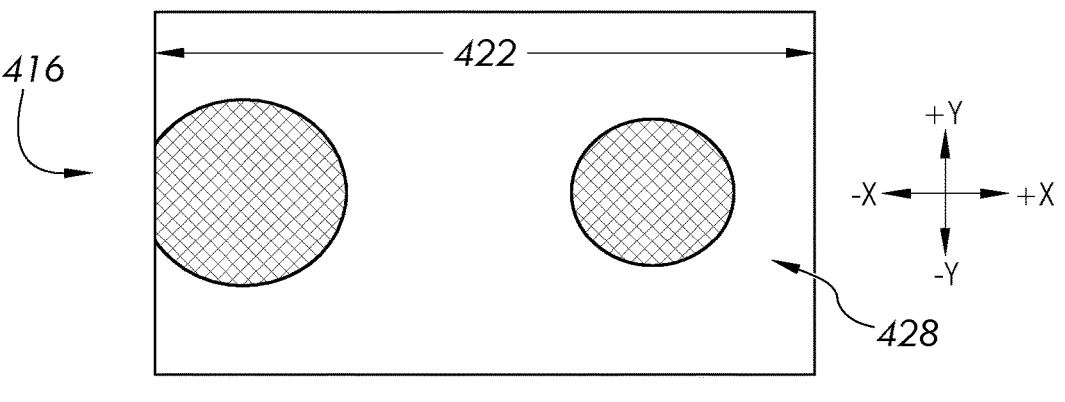
FIG. 4E depicts a unit cell of one of the deflection zones of the diffractive optical lens depicted in in FIG. 4A, according to one or more embodiments described herein.

FIGS. 4C, 4D, and 4E schematically depict unit cells 412, 414, and 416 that may be used in the fifth deflection zone 402*e*, third deflection zone 402*c*, and first deflection zone 402*a* depicted in FIGS. 4A and 4B, respectively. The unit cells 412, 414, and 416 comprise dimensions 418, 420, and 430, respectively, in the deflection direction. The dimensions 418, 420, and 422 vary in accordance with equation 4 above, as each of the first, third, and fifth deflection zones 402*a*, 402*c*, and 402*e* is a different distance x from the central axis 406 (see FIG. 4B). Given the above size constraints, nanostructures for each of the unit cells 412, 414, and 416 were designed to maximize deflection efficiencies at the necessary deflection angle in order to achieve efficient focusing at the focal point 410.

In the depicted embodiment, the unit cells 412, 414, and 416 each comprise pairs of nanostructures 424, 426, and 428, respectively. Each nanostructure of each of the pairs of nanostructures 424, 426, and 428 comprises an aspect ratio, refractive index, and asymmetrical arrangement meeting the various constraints described herein to facilitate maximum deflection efficiency. As depicted, each of the pairs of nanostructures 424, 426, and 428 comprises an arrangement similar to the unit cells 200 and 202 described herein with respect to FIGS. 2A and 2B, including first and second nanostructures that are separated from one another in the deflection direction, where one of the nanostructures comprises a truncated cylindrical pillar and the other one of the nanostructures comprises a cylindrical pillar that is differently sized (e.g., comprises a smaller or larger radius) than the truncated cylindrical pillar. The specific design of the nanostructures may vary depending on the wavelength of light being deflected and the required deflection angle $\Theta_d$.

An example diffractive cylindrical lens 400 was constructed in accordance with FIGS. 4A-4E. Each nanostructure of the unit cells in each of the deflection zones 402 was constructed of titanium oxide (having a refractive index of 2.4 at 530 nm). Each nanostructure had a height of 600 nm, and the minimum cross-sectional dimension (in the cases depicted in FIGS. 4C-4E) was greater than or equal to 100 nm and less than or equal to 140 nm. The larger nanostructure in FIG. 4A had a dimension in the x-direction of 148 nm and a dimension in the y-direction of 194 nm, while the smaller nanostructure was a circular pillar with a diameter of 140 nm. The larger nanostructure in FIG. 4B was a circular pillar having a diameter of 200 nm, while the smaller nanostructure was had a dimension of 164 nm in the y-direction and a dimension of 100 nm in the x-direction. The larger nanostructure in FIG. 4C had a dimension in the x-direction of 1160 nm and a dimension in the y-direction of 180 nm, while the smaller nanostructure was a circular pillar with a radius of 140 nm. In this example, when the incoming light 408 had wavelength of 530 nm, the dimension 418 of the unit cell 412 was 700 nm to achieve a deflection angle of 50° with a simulated efficiency of 75%. The dimension 420 of the unit cell 414 was 635 nm to achieve a deflection angle of 56.5° with a simulated efficiency of 65%. The dimension 422 of the unit cell 416 was 585 nm to achieve a deflection angle of 65° with a simulated efficiency of 65%.

The diffractive cylindrical lens 400 in this example comprised a numeral aperture of greater than or equal to 0.6 or even greater than or equal to 0.7. Thus, as demonstrated by this example, the unit cell structures in accordance with the present disclosure may be arranged to achieve relative high numerical aperture cylindrical lenses, with aspects (e.g., focal length, size of deflection zones) varying depending on the application.

FIGS. 4A, 4B, 4C, 4D, and 4E depict an example where the unit cells disposed in each of the plurality of deflection zones 402 comprise a rectangular shape. It should be understood that alternative embodiments are envisioned where the unit cells possess a non-rectangular structure. For example, in embodiments, one of the lengthwise segments (e.g., using the unit cell 416 of FIG. 4E as a baseline example to be modified, such a lengthwise segment comprises the dimension 422 in FIG. 4E) may be longer or shorter than the other one of the lengthwise segments such that the unit cell is substantially wedge-shaped. Such a wedge-shaped unit cell may facilitate construction of a circular lens (e.g., permit the unit cells to be arranged in annular segments). Embodiments are also envisioned where one or more edges of the unit cells does not extend in a straight line. For example, in embodiments, one or more external edges of a unit cell may follow a curved contour to facilitate arranging the plurality of unit cells in a curved array. It should be appreciated that the exact shape of the unit cells of the metasurfaces described herein may vary depending on the implementation.

EXAMPLES

Simulations were performed using a finite-difference time domain solver for a representative structure with unit cell aspect ratio equal to 3. Local charge and current distributions were calculated, in addition to usual quantities like electric and magnetic fields. A multipole decomposition procedure was subsequently performed, using the charge-current expansion framework to represent the origin of electromagnetic radiation in the structure by point-like multipole sources. In this instance, three distinct families of multipole sources were considered: electric, magnetic and toroidal. The latter arises from radial current density r·J, in contrast to charge and azimuthal current density (r×J), which correspond to electric and magnetic multipole moments respectively.

Figure 5:
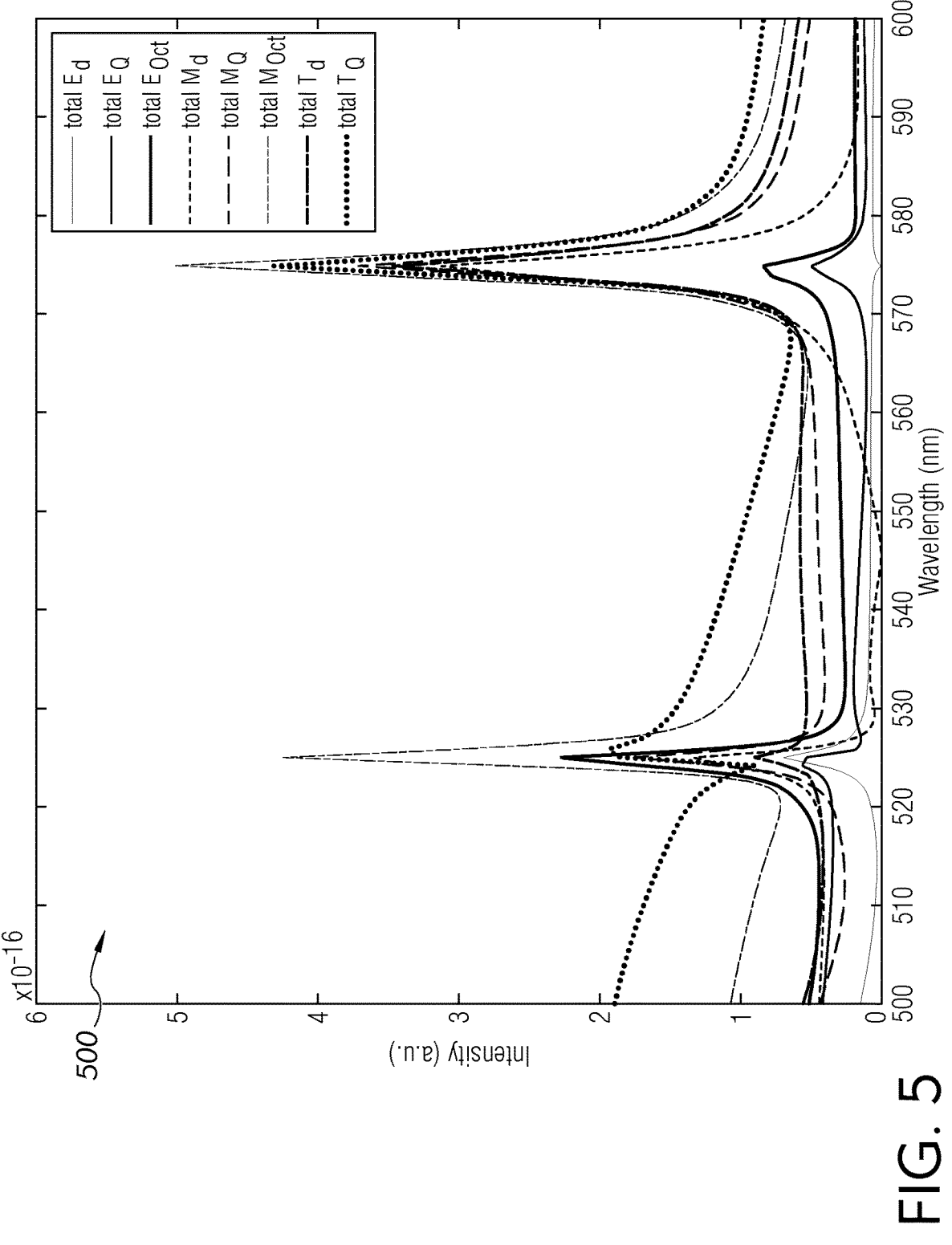
FIG. 5 depicts a simulated multipole decomposition of an example optical metasurface, according to one or more embodiments described herein.

FIG. 5 depicts a plot 500 of a simulated multipole decomposition associated with an optical metasurface similar to the transmissive metasurface 300 described herein with respect to FIG. 3. The optical metasurface comprised a plurality of square-shaped unit cells with lengths of 400 nm. In each of the unit-cells, a singular cylindrical pillar was disposed having a height equal to 600 nm and a diameter of 200 nm. The plot 500 depicts the transmission of the electrical dipolar, the electric quadrupolar, the electrical octupolar, the magnetic dipolar, the magnetic quadrupolar, the magnetic octupolar, the toroidal dipolar, and the toroidal quadrupolar modes, respectively. As depicted, each of the multipolar modes results in resonance peaks at about 525 nm and about 575 nm. Such a multipolar decomposition may be suitable for deflection of light having wavelengths between 530 nm and 550 nm at relatively large deflection angles. Shifting or tuning of these resonant peaks to accommodate arbitrary design wavelengths or deflection angles can be accomplished by changing various geometrical parameters of the nanostructure. Wavelengths at multipolar resonance peaks may result in smaller transmission due to resonant scattering. The metasurfaces described herein may be designed such that the unit cells exhibit multipolar resonances at wavelengths that are slightly offset (e.g., between 5 nm and 20 nm) from the design wavelength.

Figure 6:
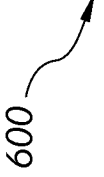
FIG. 6 depicts a simulated performance of an optical metasurface operating in the visible spectrum, according to one or more embodiments described herein.

FIG. 6 depicts a plot 600 of calculated performance of a transmissive metasurface similar to the transmissive metasurface 300 described herein with respect to FIG. 3, operating in the visible spectrum (e.g., around 530 nm). The metasurface producing the results depicted in FIG. 6 comprised a plurality of unit cells constructed similar to the unit cell 412 depicted in FIG. 4C, where the unit cells contained nanostructures constructed of titanium oxide (refractive index of 2.4 at 530 nm). The nanostructures had a 550 nm height, and each unit cell had a unit cell aspect ratio of 3.37 (for a product of 8.8). The plot 600 depicts total transmission, transmission of the $0^{th}$ diffracted order (e.g., un-scattered light), and transmission at a $1^{st}$ diffraction order at 50°. As depicted, the absolute efficiency (normalized to source power) of the $1^{st}$ diffracted order reaches about 85% and maintains a flat-top efficiency across a generic LED bandwidth between 510 nm and 550 nm (at a typical light emitting diode bandwidth), indicating the efficacy of the optical metasurfaces described herein at deflecting light emitted by available light emitting diodes.

Figure 7:
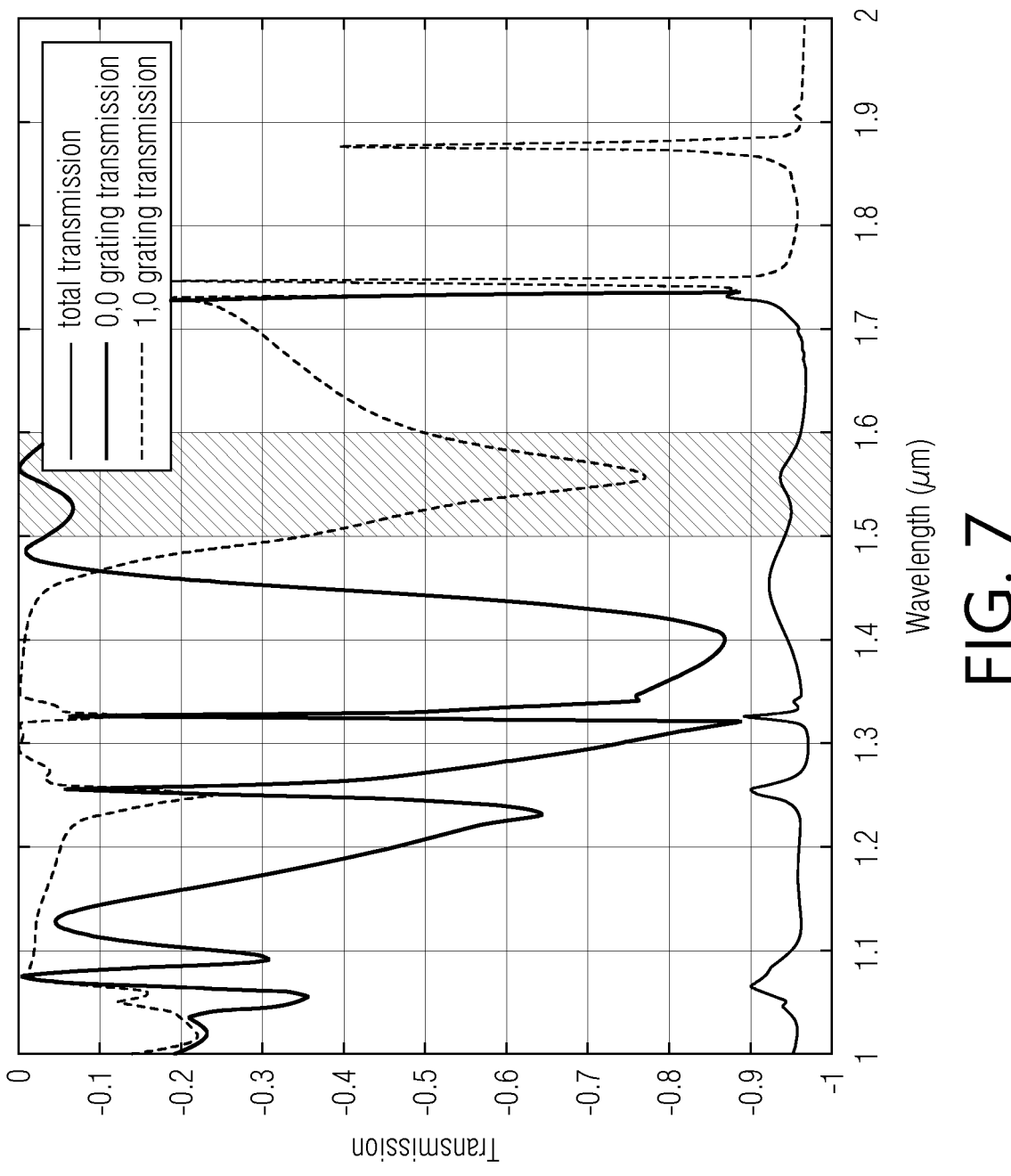
FIG. 7 depicts a simulated performance of an optical metasurface operating in reflection mode in the near infrared spectrum, according to one or more embodiments described herein.

FIG. 7 depicts a plot 700 of calculated performance of a reflective metasurface similar in structure to the optical metasurface 102 described herein with respect to FIG. 1A, operating in the near infrared (e.g., around 1500 nm). The metasurface producing the results depicted in FIG. 6 comprised a plurality of unit cells constructed similar to FIG. 4C, where the unit cells contained nanostructures constructed of silicon (refractive index of 3.4). The nanostructures had a height of 700 nm, and a unit cell aspect ratio of 4.67 (for a product of 15.9). The plot 700 depicts total transmission, transmission of the $0^{th}$ diffracted order (e.g., un-scattered light), and transmission at a $1^{st}$ diffraction order at 56°. Transmission values are negative to show that the configuration is in reflection. Peak efficiency in the $1^{st}$ diffracted order is about 77% and average efficiency across a 100 nm wavelength range (between 1.5 μm and 1.6 μm) is above 50%. This example demonstrates the efficacy of the optical metasurfaces described herein in the near infrared over a relatively wide 100 nm bandwidth.

Figure 8:
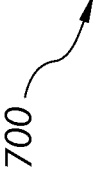
FIG. 8 depicts a simulated performance of an optical metasurface designed to deflect light within a plurality of separate wavelength ranges of interest in the visible spectrum, according to one or more embodiments described herein.

FIG. 8 depicts a plot 800 of calculated performance of a metasurface designed for multiple distinct wavelength ranges.). The metasurface producing the results depicted in FIG. 6 comprised a plurality of unit cells constructed similar to the unit cell 412 depicted in FIG. 4C, where the unit cells contained nanostructures constructed of titanium oxide (refractive index of 2.4 at 530 nm). The dimension of the unit cells was 700 nm. The smaller nanostructure in each unit cell was a cylindrical pillar having a diameter of 192 nm. The larger nanostructure had a dimension of 300 nm in the x-direction, and a dimension of 219 nm in the y-direction. The metasurface was designed to deflect light having wavelengths between 460 nm and 500 nm, between 510 and 550 nm, and between 600 and 650 nm, at deflection angles of 70°, 50°, and 40°, respectively. The plot 800 depicts total transmission, transmission of the $0^{th}$ diffracted order (e.g., un-scattered light), and transmission at a $1^{st}$ diffraction order at the angles of 70°, 50°, and 40°, respectively. As depicted, the transmission of the $1^{st}$ diffracted order is above 50% (and in some cases above 60% or 70%) in at least a portion of each of the previously-described wavelength ranges. This example demonstrates that the optical metasurfaces described herein may be designed to operate at multiple distinct wavelength ranges.

As is apparent from the foregoing description, optical metasurfaces comprising high aspect ratio, high index nanostructures with an asymmetrical nanostructure arrangement facilitate relatively large angle deflection of incoming light at deflection angles of 50° or more with relatively high efficiency. The nanostructures may be arranged in unit cells having dimensions along the deflection direction that are sized to deflect a single diffraction order in the deflection direction. The high aspect ratio design of the nanostructures facilitates the incoming light inducing displacement current therein that excites high order multipole modes emitting light in the deflection direction. Excitation of such higher order multipole modes provides higher deflection efficiencies than the vast majority of existing metasurface-based binary gratings. The unit cell described herein may be placed in various spatial arrangements to achieve various optical functions (e.g., focusing, spectral filtering, beam steering, and the like).

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical metasurface comprising:
a substrate;
a plurality of nanostructures extending from a surface of the substrate and constructed of a material having an index of refraction, the plurality of nanostructures arranged in a plurality of unit cells, wherein each of the plurality of unit cells comprises:
   a dimension that is less than or equal to twice an effective wavelength of light incident on the optical metasurface, divided by the sinusoid of a deflection angle that the optical metasurface is designed to deflect the light;
   a nanostructure arrangement of one or more of the plurality of nanostructures that is asymmetrical along a deflection direction of the optical metasurface; and
   a unit cell aspect ratio defined by a height of the one or more of the plurality of nanostructures divided by a minimum cross-sectional dimension of the one or more of the plurality of nanostructures, wherein the unit cell aspect ratio is greater than or equal to 3, and a product of the unit cell aspect ratio and the index of refraction of the material is greater than or equal to 8.

2. The optical metasurface of claim 1, wherein the plurality of unit cells are arranged in a two-dimensional pattern covering an area of the surface of the substrate.

3. The optical metasurface of claim 1, wherein: (i) the unit cell aspect ratio is greater than or equal to 10; or (ii) the index of refraction of the material is greater than or equal to 2.

4. The optical metasurface of claim 1, wherein each of the plurality of unit cells comprises a single nanostructure of the plurality of nanostructures, the single nanostructure comprising a peripheral shape that is asymmetrical along the deflection direction.

5. The optical metasurface of claim 4, wherein the single nanostructure of each of the plurality of unit cells comprises a first portion and second portion extending from the first portion, the first and second portions comprising overlapping portions of different pillar structures.

6. The optical metasurface of claim 1, wherein each of the plurality of unit cells comprises two or more nanostructures.

7. The optical metasurface of claim 6, wherein the two or more nanostructures of each of the plurality of unit cells comprise the same cross-sectional shape, but have different cross-sectional areas.

8. The optical metasurface of claim 6, wherein one of the two or more nanostructures of each of the plurality of unit cells comprises a truncated version of another one of the two or more nanostructures of the unit cell.

9. The optical metasurface of claim 1, wherein the optical metasurface deflects an optical signal at a wavelength along the deflection direction by a deflection angle of greater than or equal to 50° relative to an initial propagation direction of the optical signal prior to encountering the optical metasurface.

10. The optical metasurface of claim 9, wherein the deflection of the optical signal by the optical metasurface by the deflection angle occurs with an absolute efficiency of greater than or equal to 70%.

11. The optical metasurface of claim 10, wherein the deflection of the optical signal by the optical metasurface by the deflection angle occurs with the absolute efficiency within an entirety of a 40 nm wavelength range.

12. The optical metasurface of claim 11, wherein the 40 nm wavelength range is within the visible spectrum.

13. The optical metasurface of claim 1, wherein the optical metasurface is incorporated into an optical element comprising at least one of a lens, grating, mirror, and axicon.

14. An optical element comprising:
a surface; and
a plurality of unit cells arranged in a two-dimensional periodic structure on the surface, the two-dimensional periodic structure having periods in a first direction and a second direction extending perpendicular to the first direction that are less than or equal to 3 μm, wherein each of the plurality of unit cells comprises:
   one or more nanostructures comprising an index of refraction and an asymmetrical structure; and
   a unit cell aspect ratio defined by a length of the one or more of the plurality of nanostructures divided by a minimum cross-sectional dimension of the one or more of the plurality of nanostructures, wherein the unit cell aspect ratio is greater than or equal to 3, and a product of the unit cell aspect ratio and the index of refraction is greater than or equal to 8.

15. The optical element of claim 14, wherein:
each of the plurality of unit cells deflects an optical signal by a deflection angle along a deflection direction determined based on the structure and arrangement of the one or more nanostructures of the unit cell; and
the asymmetrical structure of the one or more nanostructures associated with one of the plurality of unit cells is asymmetrical along the deflection direction of that unit cell.

16. The optical element of claim 15, wherein the plurality of unit cells have spatially varying geometric properties along the surface to provide a distribution of deflection angles for the optical signal.

17. The optical element of claim 16, wherein a portion of the plurality of unit cells deflects the optical signal by a deflection angle that is greater than or equal to 50°.

18. The optical element of claim 15, wherein: (i) the optical element is a diffractive lens focusing the optical signal; or (ii) is a diffraction grating.

19. The optical element of claim 14, wherein: (i) the unit cell aspect ratio is greater than or equal to 3; or (ii) wherein the index of refraction is greater than or equal to 2.

20. The optical element of claim 14, wherein the unit cell aspect ratio is greater than or equal to 10.

21. The optical element of claim 14, wherein each of the plurality of unit cells comprises a single nanostructure of the plurality of nanostructures, the single nanostructure comprising a peripheral shape that is asymmetrical along the deflection direction.

22. The optical element of claim 21, wherein the single nanostructure of each of the plurality of unit cells comprises a first portion and second portion extending from the first portion, the first and second portions comprising overlapping portions of different pillar structures.

23. The optical element of claim 14, wherein each of the plurality of unit cells comprises:

a first nanostructure having a first cross-sectional shape; and a second nanostructure having a second cross-sectional shape, the first nanostructure being separated from the second nanostructure by a gap extending in the deflection direction.

24. The optical element of claim 23, wherein the first and second nanostructures of each of the plurality of unit cells comprise the same cross-sectional shape, but have different cross-sectional areas.

25. The optical element of claim 23, wherein the second nanostructure of each of the plurality of unit cells comprises a truncated version of the first nanostructure.

26. A method of scattering light at a deflection angle, the method comprising:

directing an optical signal towards an optical metasurface comprising a plurality of nanostructures comprising a plurality of unit cells, and each of the plurality of unit cells comprises a nanostructure arrangement of one or more of the plurality of nanostructures that is asymmetrical along a deflection direction of the optical metasurface; and scattering the optical signal off a unit cell of the plurality of unit cells, the unit cell comprising a unit cell aspect ratio defined by a length of a nanostructure of the unit cell divided by a minimum cross-sectional dimension of the nanostructure, wherein:

the unit cell aspect ratio is greater than or equal to 3 so as to generate a plurality of high order multipole resonances to deflect light at a wavelength of the optical signal in an off-normal deflection direction extending at the deflection angle; and the deflect angle is greater than or equal to 50°.

27. The method of claim 26, wherein the unit cell aspect ratio is greater than or equal to 10.

28. The method of claim 26, wherein:

the nanostructure of the unit cell is constructed of a material having an index of refraction; and a product of the unit cell aspect ratio and the index of refraction is greater than or equal to 8.

29. The method of claim 26, wherein the nanostructure of the unit cell comprises an asymmetrical shape along the off-normal deflection direction.

30. The method of claim 26, wherein the unit cell of the plurality of unit cell comprises a plurality of nanostructures, the plurality of nanostructures comprising an asymmetrical structure along the off-normal deflection direction.

31. The method of claim 26, wherein the nanostructure of the unit cell generates a plurality of multipole resonances at wavelengths not corresponding to the wavelength of the optical signal.

32. The method of claim 26, wherein the light of the optical signal deflected in the off-normal deflection direction comprises a single diffracted order of the optical signal.

33. The method of claim 32, wherein the light of the optical signal deflected is deflected in the deflection direction at an absolute deflection efficiency of greater than or equal to 70%.

* * * * *